United States Patent
Kumar et al.

(10) Patent No.: US 11,835,030 B2
(45) Date of Patent: Dec. 5, 2023

(54) METHODS AND SYSTEMS FOR PREDICTING RISK OF OBSERVABLE DAMAGE IN WIND TURBINE GEARBOX COMPONENTS

(71) Applicants: SENTIENT SCIENCE CORPORATION, Buffalo, NY (US); ACCIONA ENERGIA, Navarra (ES)

(72) Inventors: Vijayant Kumar, Andover, MA (US); Nathan Bolander, Idaho Falls, ID (US); Gunther Auer, Irun (ES); Inigo Zalacain, Mutilva (ES); Mercedes Irujo, Pamplona (ES); Enrique Iriarte, Sarriguren (ES)

(73) Assignees: Sentient Science Corporation, Buffalo, NY (US); Acciona Energia, Sarriguren (ES)

( * ) Notice: Subject to any disclaimer, the term of this patent is extended or adjusted under 35 U.S.C. 154(b) by 15 days.

(21) Appl. No.: 17/420,064

(22) PCT Filed: Dec. 31, 2019

(86) PCT No.: PCT/US2019/069140
§ 371 (c)(1),
(2) Date: Jun. 30, 2021

(87) PCT Pub. No.: WO2020/142542
PCT Pub. Date: Jul. 9, 2020

(65) Prior Publication Data
US 2022/0082090 A1   Mar. 17, 2022

Related U.S. Application Data

(60) Provisional application No. 62/786,817, filed on Dec. 31, 2018.

(51) Int. Cl.
*F03D 17/00* (2016.01)
*F16H 57/01* (2012.01)

(52) U.S. Cl.
CPC ............. *F03D 17/00* (2016.05); *F16H 57/01* (2013.01); *F05B 2260/80* (2013.01);
(Continued)

(58) Field of Classification Search
CPC .... F16H 57/01; F16H 2057/012; F03D 17/00; F03D 80/50; G05B 17/02;
(Continued)

(56) References Cited

U.S. PATENT DOCUMENTS 6,157,664 A    12/2000  Benedetti et al.
10,907,616 B2 *  2/2021  Kreutzfeldt ............. F03D 17/00
(Continued)

FOREIGN PATENT DOCUMENTS

CA    2710902 A1    1/2011
EP    3309682 A1    4/2018
(Continued)

*Primary Examiner* — John H Le
(74) *Attorney, Agent, or Firm* — Hodgson Russ LLP (57) ABSTRACT

Embodiments disclosed herein may include methods, systems, and tangible, non-transient, computer-readable media having instructions thereupon for determining a damage state of a wind turbine gearbox. A method performed, executed on a processor of a system, or implemented by a processor as instructions, may comprise producing a damage state diagnostic, producing a damage progression model for the wind turbine gearbox using operational data and a state transition function, and combining the damage state diagnostic with the damage progression model using a hybrid prognostics model to produce a probability distribution of a current damage state estimate. Producing the damage state diagnostic may comprise obtaining a measurement dataset for the wind turbine gearbox, integrating field-operator-
(Continued)

provided intelligence into the measurement dataset, normalizing the measurement dataset with respect to a known failure behavior for the wind turbine gearbox, and combining the normalized measurement dataset with the known failure behavior to produce the damage state diagnostic.

24 Claims, 3 Drawing Sheets

(52) U.S. Cl.
CPC ....... *F05B 2260/83* (2013.01); *F05B 2270/32* (2013.01); *F05B 2270/321* (2013.01); *F05B 2270/334* (2013.01); *F05B 2270/335* (2013.01); *F16H 2057/012* (2013.01)

(58) Field of Classification Search
CPC ....... G05B 2219/32234; F05B 2270/32; F05B 2270/321; F05B 2270/334; F05B 2270/335; F05B 2260/4031; F05B 2260/80; F05B 2260/83; F05B 2260/84; Y02E 10/72
USPC .......................................................... 702/34
See application file for complete search history.

(56) References Cited

U.S. PATENT DOCUMENTS

| | | | |
|---|---|---|---|
| 10,984,154 B2* | 4/2021 | Wang | G01R 31/343 |
| 11,073,446 B2 | 7/2021 | Wakasugi | |
| 11,237,200 B2 | 2/2022 | Wakabayashi | |
| 2009/0300417 A1 | 12/2009 | Bonissone et al. | |
| 2011/0020122 A1* | 1/2011 | Parthasarathy | F03D 80/50 416/61 |
| 2011/0106510 A1 | 5/2011 | Poon | |
| 2011/0125419 A1 | 5/2011 | Bechhoefer et al. | |
| 2011/0313726 A1* | 12/2011 | Parthasarathy | F03D 80/50 702/179 |
| 2013/0116937 A1 | 5/2013 | Calhoun et al. | |
| 2013/0184838 A1* | 7/2013 | Tchoryk, Jr. | G01S 17/58 700/31 |
| 2014/0046881 A1 | 2/2014 | Losl et al. | |
| 2014/0088887 A1 | 3/2014 | Poon et al. | |
| 2014/0100703 A1 | 4/2014 | Düll et al. | |
| 2014/0288855 A1* | 9/2014 | Deshpande | F03D 7/0292 702/34 |
| 2018/0259955 A1 | 9/2018 | Noto | |
| 2020/0201950 A1* | 6/2020 | Wang | F03D 17/00 |

FOREIGN PATENT DOCUMENTS

| | | |
|---|---|---|
| JP | 2012-053830 A | 3/2012 |
| JP | 2013-007388 A | 1/2013 |
| JP | 2015-088154 A | 5/2015 |
| JP | 2018-178968 A | 11/2018 |
| WO | 2012/160371 A2 | 11/2012 |

* cited by examiner

METHODS AND SYSTEMS FOR PREDICTING RISK OF OBSERVABLE DAMAGE IN WIND TURBINE GEARBOX COMPONENTS

CROSS REFERENCE TO RELATED APPLICATIONS

This application claims priority to U.S. Provisional Application No. 62/786,817, filed on 31 Dec. 2018, the entire disclosure of which is hereby incorporated by reference.

FIELD OF THE DISCLOSURE

The disclosure generally relates to wind turbines. More particularly the disclosure generally relates to methods of assessing risk of observable damage of wind turbine gearbox components.

BACKGROUND OF THE DISCLOSURE

Prediction and mitigation of damage accumulation in wind turbine components is a multi-billion dollar opportunity globally given the exponential growth in installed wind turbine base. The rapid rise in the number of operating wind turbines in the world over the last several years have led to the field-verified realization that wind turbine gearbox (WTG) components of those wind turbines show damage accumulation faster than expected and resulting rise in gearbox failures have resulted in multi-million dollar increases in operation and maintenance (O&M) expenditures. As a result, there is an ever-growing demand for solutions that can provide early warning of damage initiation and tracking of damage progression with reduced uncertainty, intelligent asset actions intimately linked to specific damage/failure modes and, real-data-driven reliability analytics to optimize long-term maintenance and component purchasing strategy.

A variety of predictive algorithms have been developed and applied to predict damage accumulation in WTG components. Such methods were either purely physics-based or purely data/statistics-based and often relied on integration of additional expensive retrofitted suite of sensors. Some hybrid methods were proposed that attempted to combine physics-based approaches with a statistical, data-driven approach, relying on the retrofitting of sensors. These methods suffered from lack of scalability, high uncertainty (i.e. low accuracy of predictions), and economic impracticality due to requirement of expensive retrofit sensors (e.g., CMS). The primary reasons for these shortcomings included a lack of accurate representation of subcomponent-level physics and multi-body drivetrain interactions; an over-reliance on pure data-driven predictions using time-series data ("Big Data") from wind turbine SCADA system; minimal integration of digitalized "small data," that is, site and customer-specific information (e.g. alarm logs, site O&M historical logs, bill of material information, geo-spatial information, and configuration information); poor data governance leading to high amounts of undetected noise and inconsistent information in various data inputs; and minimal integration of quantified field intelligence derived from actual on-site operator' experience.

Therefore, a need exists for improved methods and systems to accurately assess the risk of observable damage in WTG components.

SUMMARY OF THE DISCLOSURE

An embodiment may be a method for determining a damage state of a wind turbine gearbox of a wind turbine. The method may comprise producing (i.e., generating) a damage state diagnostic, producing a damage progression model for the wind turbine gearbox using operational data and a state transition function, and combining the damage state diagnostic with the damage progression model using a hybrid prognostics model, to produce (i.e., generate) a probability distribution of a current damage state estimate.

An embodiment may be a system for determining a damage state of a wind turbine gearbox of a wind turbine. The system may comprise a processor. The processor may be configured to execute a method comprising producing a damage state diagnostic, producing a damage progression model for the wind turbine gearbox using operational data and a state transition function, and combining the damage state diagnostic with the damage progression model using a hybrid prognostics model to produce a probability distribution of a current damage state estimate.

An embodiment may be a tangible, non-transient, computer-readable media having instructions thereupon. The instructions, when implemented by a processor, may cause the processor to perform a method for determining a damage state of a wind turbine gearbox of a wind turbine, comprising producing a damage state diagnostic, producing a damage progression model for the wind turbine gearbox using operational data and a state transition function, and combining the damage state diagnostic with the damage progression model using a hybrid prognostics model to produce a probability distribution of a current damage state estimate.

Producing the damage state diagnostic may comprise obtaining a measurement dataset from the wind turbine, integrating field-operator-provided intelligence into the measurement dataset, normalizing the measurement dataset with respect to a known failure behavior for the wind turbine gearbox to produce a normalized measurement dataset, and combining the normalized measurement dataset with the known failure behavior to produce the damage state diagnostic.

The hybrid prognostic model may include a sample-based predictor. The method, whether performed, executed on a processor of a system, or implemented by a processor as instructions from a tangible, non-transient computer readable media, may further comprise using the hybrid prognostics model to produce a future state prediction. The future state prediction may include a probability of the wind turbine gearbox reaching a critical damage threshold for a prediction horizon, a time to reach the prediction horizon, and a system state of the wind turbine gearbox at a timestep of the time to reach the prediction horizon.

The damage progression model may comprise a physics-based model. The physics-based model may include one or more of finite element analysis, computational fluid dynamics, multi-body dynamics, or linear elastic fracture mechanics The damage progression model may comprise a machine learning-based model.

The field-operator-provided field intelligence may comprise operator findings of failure or damages seen prior. The operator findings of failure or damages seen prior may include anecdotes not present in a borescope analysis. The method, whether performed, executed on a processor of a system, or implemented by a processor as instructions from a tangible, non-transient computer readable media, may further comprise building a model or building a data representation using the operator findings or damages seen prior.

The measurement dataset may comprise one or more of direct measurement data, indirect measurement data, global behavior, or operational data.

The measurement dataset may comprise direct measurement data. Obtaining the measurement dataset may include performing a direct measurement using a measurement unit to obtain the direct measurement data. The measurement unit may comprise a borescope.

The measurement dataset may comprise indirect measurement data and obtaining the measurement dataset may include performing an indirect measurement using a temperature sensor or a vibration sensor.

The global behavior data may include a comparison of operational data of one or more similar wind turbines similarly configured to the wind turbine.

Operational data may include supervisory control and data acquisition (SCADA) data. The SCADA data may include one or more of system input data, system output data, or a time series of system logs. The SCADA data may include system input data and the system input data may include one or more of wind speed or wind direction. The SCADA data may include system output data and the system output data may include power generated. The SCADA data may include the time series of system logs and the time series of system logs may include a time series of wind turbine status or faults.

The known failure behavior may be derived from historic data. The historic data may comprise maintenance records, field failure information, root cause analysis, or bill-of-materials data.

BRIEF DESCRIPTION OF THE FIGURES

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

The present disclosure provides for methods, systems, and apparatuses for predicting risk of observable damage existent in WTG components, such as bearings and gears. Observable damage may refer to the existence of visually identifiable physical damage in single or multiple gearbox subcomponent(s) caused by damage accumulation over time. Damage accumulation may refer to a process by which the components in a WTG, which transmit torque from the rotor to the generator, degrade over time due to the formation of microscopic cracks that grow under repeated loading cycles.

Embodiments of the present disclosure implement a novel combination of material science, data science, and field experience insights to deliver accurate predictions of damage accumulation risk for WTG components and, in turn, drive efficient optimization of operational maintenance and life extension of wind turbines. These embodiments may include a process of utilizing heterogeneous sets of information for predicting wind turbine reliability. Additionally, such embodiments may provide a tool for designers, site managers, asset managers, and risk managers to evaluate the performance of WTG components under a variety of scenarios—varying materials, manufacturing processes, and operating conditions—without having to resort to expensive and time-consuming testing. The inputs to embodiment methods and systems using data fusion processes according to the present disclosure may include material physics models, data science models, and field experience insights.

Material-physics-driven models may use laws of physics to represent a causal understanding of physical processes responsible for damage initiation and propagation through computational models.

Material physics models may have strengths in their ability to represent issues and failure modes through purely physics-based understanding—without any requirement of continuous sensor measurement(s). They can provide a long-term probabilistic view of damage accumulation and time-to-failure, along with a measure of uncertainty to allow risk-tuned decision making. They may be highly explainable and interpretable—that is, the designers and creators may have a clear understanding of the reasons why outputs look and behave a certain way since the outputs are results of physical rules.

Material physics models may be limited to representation of failure modes explicitly represented through individual models. Thus, this approach cannot represent or predict failure models either unknown or lack a physics-based cause-and-effect pathway following from the WTG's design (e.g., issues originating from manufacturing, design, or site-specific operating issues, etc.). Material physics models also may have high computational cost, oftentimes requiring supercomputers or large numbers of memory-intensive cloud nodes, and may be thus inherently unsuitable for solutions of scale.

Data science models may refer to a family of statistical learning techniques focused on anomaly-detection and decision-tree type techniques. Such models may aim to use features derived purely from sensors and correlation/association between them to predict accumulation and progression of damage. Note that, unlike physics-driven models, data-driven models do not require a cause-and-effect pathway to form a basis of the predictive algorithm, as a data-driven model relies on correlation rather than causation.

Data science models may have strengths in their ability to identify multiple predictive patterns in data without the need for identification of relevant features. They may be highly suited for short-term damage prediction problems through techniques such as anomaly detection and classification tree-type methods. They may have a computation cost that is comparatively low and suited for solutions of scale. They can integrate varieties of data into a single predictive model (e.g., sensor datasets, log-type datasets, or field intelligence through expert rules, etc.).

Data science models may be limited as direct functions of data and are highly prone to issues such as over-fitting, which can lead to false positives. They may require large amounts of data to train, test, and implement. They may be highly sensitive to noise in the data—models can learn both noise and signal equally if not filtered through domain knowledge. They may need previous known occurrences of failure to be able to predict failures of similar kind. They may not be able to predict what is not present in the data used for training the model.

Field experience insights may refer to a distillation of field personnel/asset manager experience in handling a variety of failures and issues while operating wind farms in a variety of conditions and locations. Such field experience insights can be incorporated with the predictive materials physics and data science models to refine an overall data fusion model.

The approach presented here may rely on a data fusion (i.e., combining) of material-physics-driven modeling and data science guided by field-experience derived intelligence. This data fusion approach may be built on optimizing strengths and limitations of each of the inputs to the data fusion.

Data fusion may estimate the current damage state, provide prediction of remaining useful life (RUL), and can be described as a decision-level fusion where various predictive techniques and field intelligence are used in combination to provide a quasi-independent determination of a time window associated with a predicted risk of visible damage. A core advantage to data fusion may be attributable to the use of a material physics modeling framework, wherein the actual physical processes involved in component degradation may be modeled rather than relying solely on statistical analysis of collected data.

A material physics modeling approach according to the present disclosure can combine and simulate a wide variety of input parameters without an assumption of linearity in parameter dependencies or damage accumulation. This may be enabled by embedding a high-fidelity modeling representation of stresses and strains driving the damage accumulation process to account for common WTG component failure modes such as rolling contact fatigue and wear.

The material-physics-driven modeling approach may consider the following techniques applied to various contributing stages of the gearbox component damage accumulation process. This unique combination may allow for a more accurate and flexible prediction of damage progression. The techniques may include, inter alia: wind loading calculated using aeroelastic simulation software, including the effects of wind speed, wind shear, turbulence intensity, and air density; multi-body dynamic analysis of load transmission from rotor through the gearbox to the generator, including shaft and gearbox housing flexure; and high-fidelity component loading models that can accurately describe the distribution of macro level loading to the subcomponent level, including the simulation of conditions governing the tribological behavior of contacting bodies.

The data science component of the data fusion approach may utilize heterogeneous "big" and "small" data transformed in predictive decision data streams through multiple predictive frameworks. Examples of such data streams may include, inter alia: time-series data from various sensors in a wind turbine—usually referred to as supervisory control and data acquisition (SCADA) data; various operational logs (e.g., logs of faults/alarms, logs of turbine operating states, or site notes entered manually by on-site maintenance technicians); digitized records of previous-known damage/failure diagnostics and reports (e.g., borescope images, oil analyses, or root-cause analysis reports, etc.); history of maintenance and replacement events on each wind turbine (e.g. bearing replacement, gearbox replacement, or routine maintenance); geo-spatial information, including geographic coordinates of each turbine or other geographic datasets (land use, terrain etc.) encompassing the entire wind farm; time-series data of meteorological data from point locations (and their coordinates) within the wind farm, or if unavailable, documents describing the measured climatological conditions used to assess the anticipated weather-related risks on the wind farm design; and/or a bill of materials (BOM) for each WTG.

Each of these input datasets may be utilized through various different predictive data science models based on the partitioning of input datasets based on percentage representation of the specific information and fidelity regarding specific aspects of wind turbine operational behavior. The data science component of the data fusion approach may involve running an ensemble of time-series type classification and regression models along with statistical models, which may convert qualitative risk factors into quantifiable indices. For instance, point measurements residing in the SCADA systems cannot represent an entire three-dimensional envelope of loads and environmental conditions encountered by a spinning wind turbine. Therefore, statistical models can combine terrain information, wind turbine coordinates empirical rules, and site-level wind direction time-series into a turbine-level risk index representing risk of high turbulent loads from both wind farm density and steep terrain. Similarly, known turbine-level alarm logs may be converted into a time-based aggregated score, which can be used as a damage risk feature. All such features, along with standard features derived from time-series datasets, may be analyzed, in a training mode, against known past failure records for various turbines. This step can inform an operator if the features used have predictive power for known damage/failure events when represented in either classification-type models or regression-type anomaly detector models. Each of the data science models within the ensemble may produce a risk ranking including magnitude of damage and time window of damage for all the modeled wind turbines.

Through execution of both the material physics models and the supporting data science models, various modeling outputs may be generated and combined through a hybrid RUL estimation framework.

The RUL framework may be cognizant of the fact that, at any given point of time, not all known ways a turbine gearbox can be damaged or fail are represented through the various damage progression and measurement models embedded in the framework. This incomplete representation of damage-causing issues may be manifested through incorrect predictions—deemed incorrect through comparison against gearbox borescope analyses (a direct measurement) or other known failures for a wind turbine gearbox. Thus, the present disclosure may utilize a third input: field intelligence obtained from turbine operators and managers.

Figure 1:
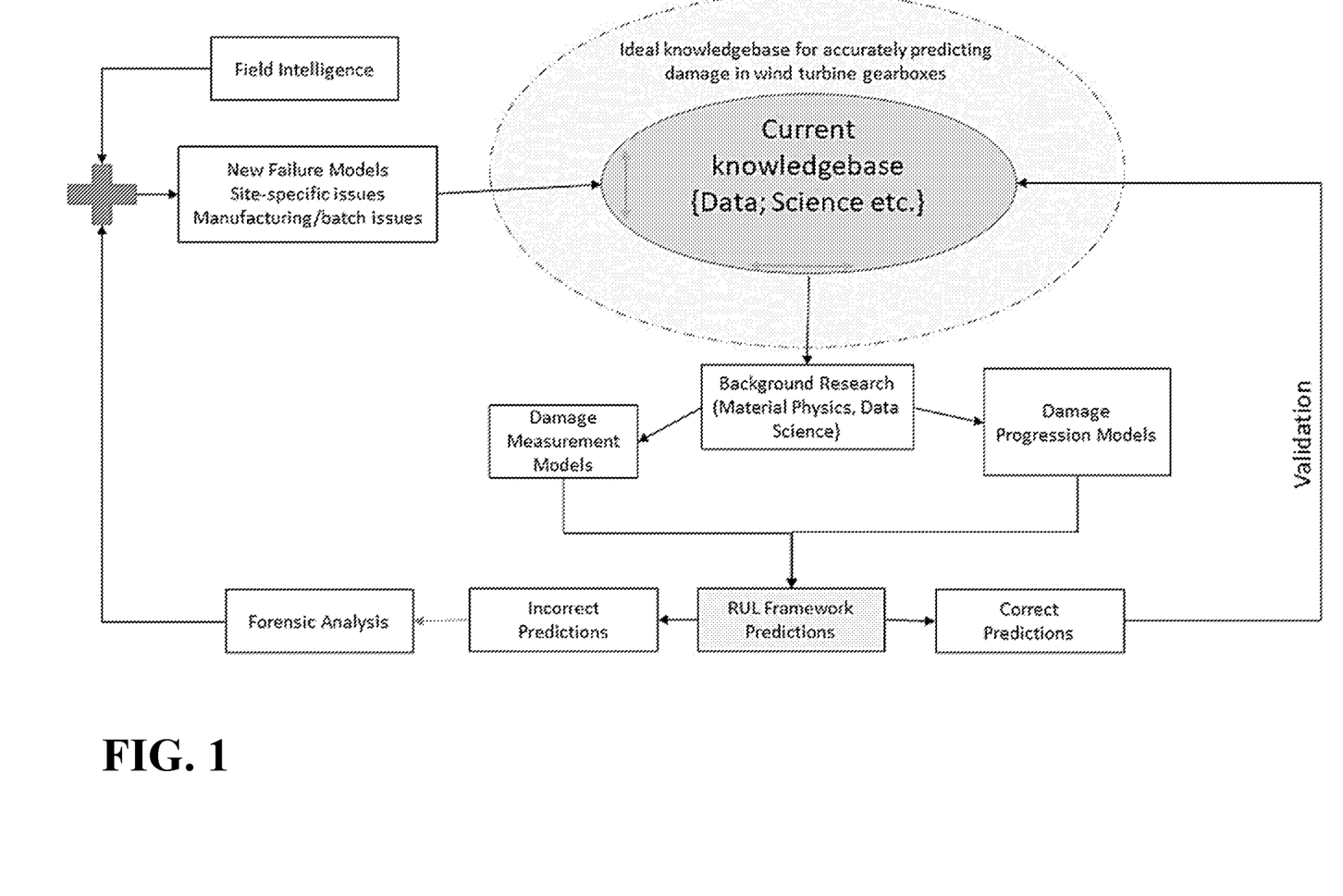
FIG. 1 is a flowchart illustrating an embodiment of the method.

FIG. 1 presents this in a flowchart illustrating an embodiment method. For example, every time an incorrect prediction occurs, a forensic analysis may be conducted and directly compared to experience-based field intelligence. This may reveal specific causes of damage or failure not represented in the RUL framework. Any such determination of a new cause may be further vetted through detailed analysis and modeling research to form a hypothesis and represent it as a new damage measurement/progression model.

It is important to note that an estimation or prediction of a current damage state may be directly tied to a field inspection of a damage event. Based on the outcome of the field inspection triggered from a damage estimation method, the framework can either update the future predicted RUL or, in case of an incorrect prediction, lead to an enhancement of embedded models through forensic analysis and integration of field intelligence into the model.

Figure 2:
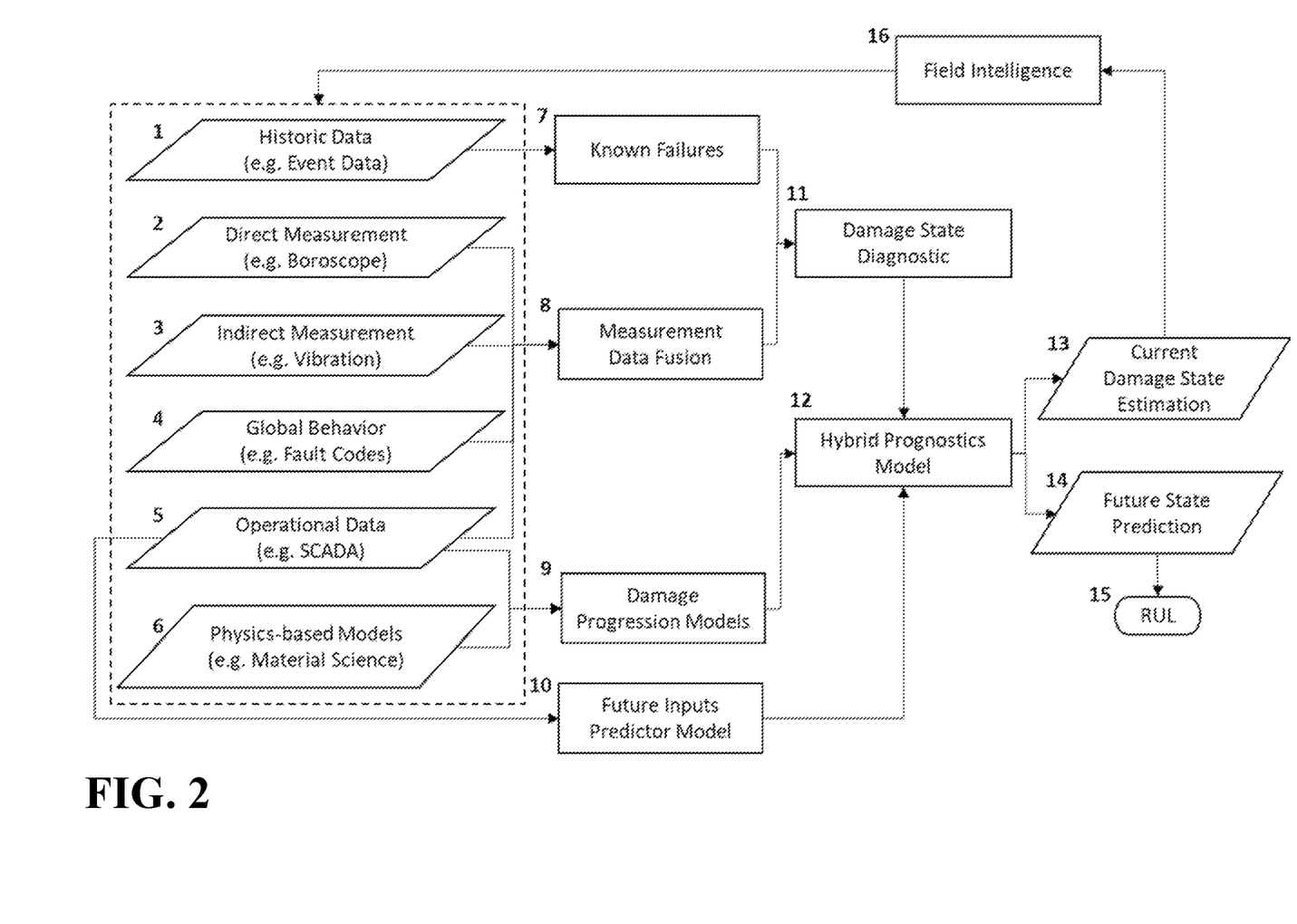
FIG. 2 illustrates an embodiment hybrid remaining useful life framework incorporating data fusion.

An embodiment hybrid RUL framework incorporating data fusion is illustrated in FIG. 2. In order to maximize the accuracy of the predictions, many disparate data streams may be utilized simultaneously. Data from prior events 1, also known as 'historic data', may comprise maintenance records, field failure information, root cause analysis, BOM data, etc. The historic data may be used to extract comparative information for damage that has occurred previously on similarly installed and utilized systems and/or components (i.e., assets), such as similar wind turbines having similar configurations to the wind turbine for which a damage state is to be determined. These data from prior events may be separate from information streams derived from either direct or indirect measurements of the current asset, several examples of which are shown 2-4.

The current damage state of the asset may be assessed through a direct physical inspection, during which a damage state relative to installed condition can be quantified using a measurement instrument. Accuracy and precision of these measurements can be dependent on the instrument that is used. For example, borescope imaging 2 is often used by wind turbine technicians to inspect the components in the gearbox. Images of damaged areas may be used to classify generally the damage state (e.g. Damage Classes 1-4) according to the magnitude of the observed damaged area. Direct measurements can be subject to instrument error.

An indirect measurement 3 of damage state can be obtained through sensors monitoring the asset during operation. Sensor measurements can provide time-series data of system parameters that are functionally dependent on the changing damage state. For example, a temperature sensor installed within a WTG can measure a time-series of temperature and a concomitant study of past known failures may reveal a significant number of such events associated with higher temperatures. This was previously referred to as an anomaly-detector data science model. For instance, clustering techniques can define a "normal behavior" of specific relevant temperature variables (based on data analysis of time-series from previous known failures), and a tuned measure of damage threshold created through all temperature anomalies from a regression-type temperature predictor model can yield a cumulative measure of such anomalies is used to provide an indirect measure of damage state. Indirect measurements can be subject to two primary sources of error, namely, measurement error and mapping error. Measurement error may refer to issues with calibration, drift, EMI, etc. Mapping error may refer to uncertainty introduced through the process of relating the measured variable to the latent variable of interest (i.e., damage state).

Another indirect measurement can be obtained through use of data science models using measurements of global system behavior. Since the global behavior of the system may change over time as the condition of the asset degrades, this data stream can be useful independent data stream that can be used to augment the understanding of the current health state of the asset. Examples of such global system behavior data 4 for the wind turbine application may be alarm/fault codes. Fault codes may be produced by the controller according to rules that define normal vs abnormal behavior. For example, a temperature exceedance fault may be generated by the controller when one or more sensors measure temperatures in excess of some predefined value. Methods according to the present disclosure may utilize trained data science models based on validated relationships between specific sequences of various fault codes to past known damage/failure events. Outputs of such models running on time-aggregated feature sets of various alarm codes can thus represent another indirect measurement of current damage state.

An understanding of the physical models of failure modes that are relevant for the asset of interest can be used to develop models that describe how the asset degrades with time and usage. Such physics-based models 6 can take various forms depending on the physics involved. Some examples of common physics-based modeling techniques include finite element analysis (FEA), computational fluid dynamics (CFD), multi-body dynamics (MBD), and Linear Elastic Fracture Mechanics (LEFM). The term 'damage' in relation to physical components is usually related to a change in the state of the constitutive materials, therefore a sufficient understanding of the material response to the operational conditions (material science) is necessary to develop an effective model. Since models approximate a true physical system, an understanding of the sources of model uncertainty is also necessary.

Measurement systems 3-4 as well as material physics-based models use operational data 5, which provides information describing the conditions of usage for the asset. Such data may comprise sensor time-series measurements. In wind turbines, a Supervisory Control And Data Acquisition (SCADA) system may perform this function, acquiring system input data (e.g., wind speed, direction), system outputs (e.g., power generated), and any time-series of system logs (e.g., status/faults etc.). Operational data may be comprised of local measurement (visual inspection as example), remote measurement (sensor data). Operational data may be broken out also into providing local behavior of a single asset and global behavior data that can allow comparison of asset to Met Mast (i.e., a tower containing weather measuring equipment) or multiple turbines.

The definition of 'critical damage level' for an asset may vary considerably depending on a number of factors. In general, critical damage level defines a state of damage at which the asset can no longer safely perform its intended function. Historic data can be used in part to define the state of damage at which similar assets were removed from service. Analysis of a database containing, for example, the asset bill-of-materials, known operating conditions/usage, maintenance records, etc., can extract a population of known failures 7 that are similar in nature to the asset and failure mode of interest.

As noted above, in addition to direct measurement of field-validated damage (e.g. borescopes), various data science models may directly serve as measurement objects to provide a measurement of current damage state.

The outputs of the measurement data fusion process 8 may be normalized ($0 \leq D \leq 1$) with respect to known failure behavior 7 of the WTG (e.g., based on past performance of similar WTGs) to develop a damage state diagnostic 11. The damage state 'diagnostic' may be defined as a single measurement (i.e. an observation) of the asset in operation. Diagnostic data must be reported with an associated measure of uncertainty. For example, diagnostic data exhibiting Gaussian uncertainty may be reported in terms of the mean and variance of the distribution.

A Damage Progression Model 9 may be defined in terms of a state transition function, where-in system inputs are functionally related to the damage progression rate. Such functions may be (with few exceptions) monotonic in nature—a gear or bearing will not 'un-wear' as time\usage increases. Damage progression models may be physics-based 6 or may be derived from data analytics (machine learning).

In order to make a prediction of future damage state, an understanding of future usage is required. A future inputs predictor model 10 may be used to analyze prior operational conditions that have been experience by the asset and extrapolate future usage patterns. In the wind turbine example, the prior SCADA data may be mined to determine wind load histograms representative of that particular asset for each month, thus allowing seasonal variations to be taken into account.

Information from both measurements (diagnostics) and damage progression models can be combined in a hybrid prognostics model 12. A hybrid prognostics model can be generally defined as one utilizing evidence from multiple independent data streams in conjunction with an underlying damage progression function to produce probabilistic estimations of current and future states.

A number of different state estimation algorithms can be employed to combine diagnostic observation data with the damage progression model (Kalman filter, Unscented Kalman filter, particle filter, etc.) the output being a probability distribution for the current damage state estimate 13. A sample-based prediction algorithm may then be used to produce (i.e., generate) a future state prediction 15, which may include the probability of the WTG reaching the critical damage threshold for a given prediction horizon, time to reach the horizon, and the system states of the WTG at each future timestep (e.g., until the horizon is reached).

In application, a current state estimation 13 indicating a damage level of concern to an operator may trigger a manual inspection process or other maintenance action by experts in the field. The empirical knowledge of nominal behavior garnered through experience is a resource that can be used to 'tune' prognostic models. Field Intelligence 16 can be used to identify off-nominal conditions for a specific asset that may contribute to unexpected damage progression. Such conditions may often be unobservable in the online data streams (e.g. lubricant contamination, assembly issues, damage in secondary components, etc.), yet may result in a significant deviation from nominal damage progression behavior. Integrating field intelligence as a source of feedback into the prognostic prediction process may provide a formal mechanism for the algorithms to be adjusted based on true conditions of the asset.

Figure 3:
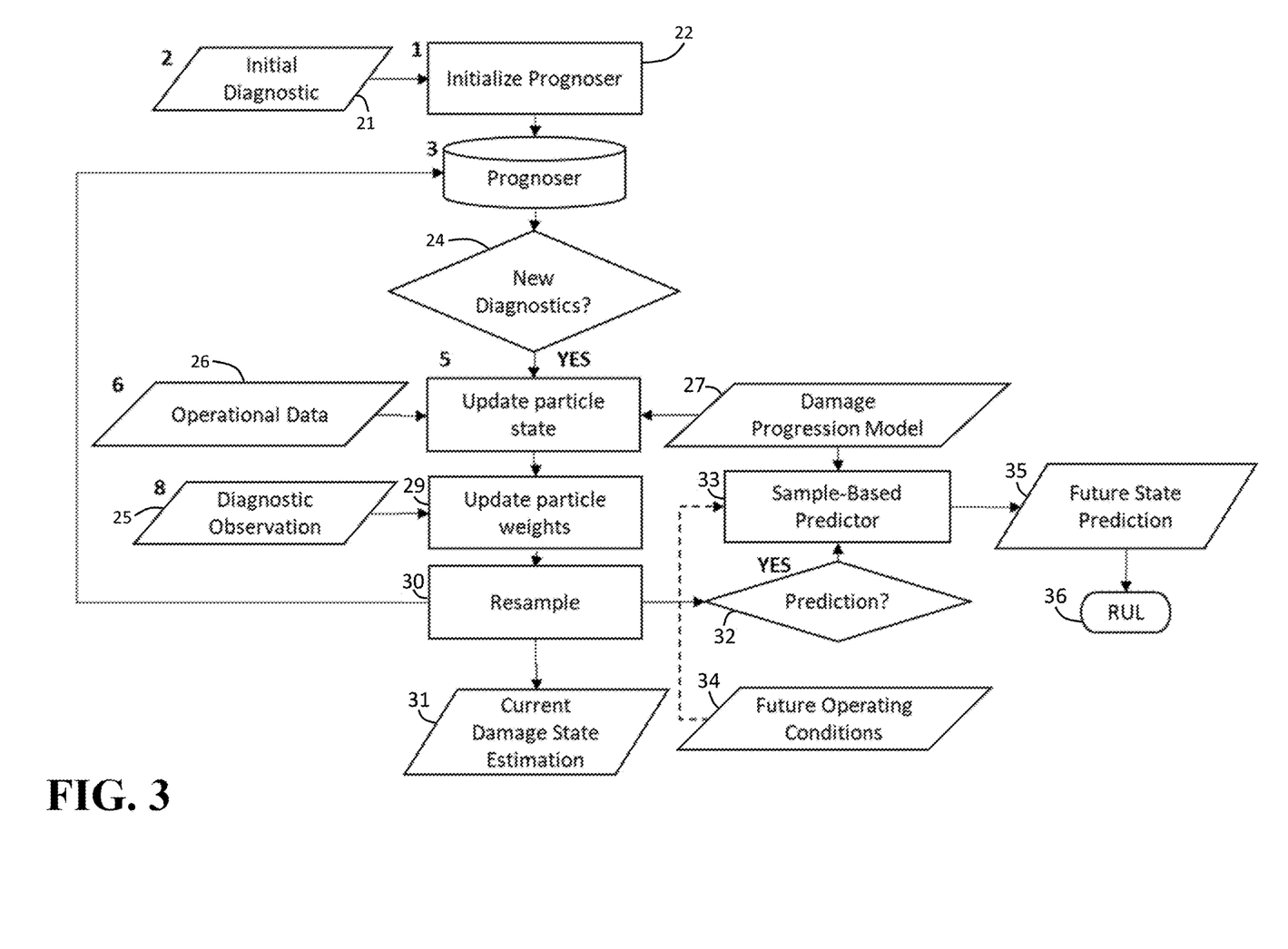
FIG. 3 illustrates an example implementation of a hybrid prognostics model.

FIG. 3 presents an example implementation of a hybrid prognostics model 12. The purpose of the prognoser object is to encapsulate the functionality for joint state-parameter estimation and uncertainty management. The prognoser object may be initialized 22 using an initial state estimation. In the given example particle filter implementation, initial particle states variables may be sampled from the initial diagnostic 21. At this time the prognoser may also be provided with hooks to the diagnostic data stream 25, the asset operational condition database 26, and assigned one or more damage progression models 27. The prognoser object may then be stored 23 for later use.

When a new diagnostic data point is detected 24, the prognoser first may update the model state variables utilizing the operational data 26 from the time of the last update $(T_i-1)$ until current time $(T_i)$ using the damage progression model 27 to establish an estimate. The particle filter algorithm employed here may be based on Sampling Importance Resampling (SIR) and can be readily found in the literature. Particle weights may then be updated 29 based on likelihood of the given diagnostic observation 28. Particle degeneracy can occur when a small number of particles have high weight and the rest have very low weight. In order to avoid degeneracy issues, particles may be resampled 30 following the weight calculation. The updated and resampled weighted particles thus represent the current damage state estimation 31 as a discrete probability distribution.

If a forward prediction for end of life (EOL) or remaining useful life (RUL) is desired 32, a sample-based predictor 33 can be used to propagate each particle state forward in time until the damage state exceeds the critical level using estimated future operating conditions 34 and the damage progression model 27. Due to uncertainty in both the model and the future operating conditions, the future state prediction 35 may also be described by a discrete probability density function. RUL 36 can be calculated as the difference between the current time and some measure (e.g., mean value) of the future state distribution.

In an example embodiment, a method for determining a damage state of a wind turbine gearbox may comprise producing a damage state diagnostic. The damage state diagnostic may be produced by obtaining a measurement dataset of a wind turbine, integrating field-operator-provided field intelligence into the measurement dataset, normalizing the measurement dataset with respect to a known failure behavior to produce a normalized measurement dataset, and combining the normalized measurement dataset with the known failure behavior to produce the damage state diagnostic. Examples of field-operator-provided field intelligence may include operator findings of failure or damages seen prior (e.g., anecdotes which are not present in any current borescopes), which can be used to build models or represent in data.

The measurement dataset may comprise one or more of direct measurement data, indirect measurement data, global behavior, and operational data. Direct measurement may include using a measurement, wherein the measurement unit is, for example, a borescope. Examples of indirect measurements may include using temperature sensors or vibration sensors. Examples of global behavior may include comparisons of operational data of similarly configured wind turbines. Operational data may include, for example, supervisory control and data acquisition (SCADA) data, and SCADA data may include, for example, system input data, system output data, or a time series of system logs. System input data may include, for example, wind speed or wind direction. System output data may include, for example, power generated by the subject wind turbine. The time series of system logs may include, for example, a time series of wind turbine statuses and/or faults.

The known failure behavior may, for example, be derived from historic data, which may comprise, for example, maintenance records, field failure information, root cause analysis, and/or bill-of-materials data.

The method may further include using operational data and a state transition function to produce a damage progression model for the wind turbine gearbox. A hybrid prognostics model may be used to combine the damage state diagnostic with the damage progression model to produce a probability distribution for a current damage state estimate. In some embodiments, the hybrid prognostic model may further use a sample-based predictor to produce a future state prediction. The future state prediction may include one or more of a probability of reaching a critical damage threshold for a prediction horizon, a time to reach the prediction horizon, and a system state at a timestep.

In some embodiments, the damage progression model may be a physics-based model incorporating, for example, finite element analysis, computational fluid dynamics, multi-body dynamics, and/or linear elastic fracture mechanics. In some embodiments, the damage progression model may be a machine learning-based model. In some embodiments, the damage progression model may include components of both a physics-based model and a machine-learning model.

The present disclosure may be embodied as a system for determining a damage state of a wind turbine gearbox, wherein the system may implement any of the methods described herein. Such a system may be, for example, a processor programmed to perform any of the disclosed methods. Such a system may further include communication links for receiving one or more of SCADA data, direct measurement data, indirect measurement data, operational data, etc.

The processor may be in communication with and/or include a memory. The memory can be, for example, a Random-Access Memory (RAM) (e.g., a dynamic RAM, a static RAM), a flash memory, a removable memory, and/or so forth. In some instances, instructions associated with performing the operations described herein (e.g., operate an image sensor, extract, from the holographic image, a plurality of patches) can be stored within the memory and/or a storage medium (which, in some embodiments, includes a database in which the instructions are stored) and the instructions are executed at the processor.

In some instances, the processor may include one or more modules and/or components. Each module/component executed by the processor can be any combination of hardware-based module/component (e.g., a field-programmable gate array (FPGA), an application specific integrated circuit (ASIC), a digital signal processor (DSP)), software-based module (e.g., a module of computer code stored in the memory and/or in the database, and/or executed at the processor), and/or a combination of hardware- and software-based modules. Each module/component executed by the processor may be capable of performing one or more specific functions/operations as described herein. In some instances, the modules/components included and executed in the processor can be, for example, a process, application, virtual machine, and/or some other hardware or software module/component. The processor can be any suitable processor configured to run and/or execute those modules/components. The processor can be any suitable processing device configured to run and/or execute a set of instructions or code. For example, the processor can be a general purpose processor, a central processing unit (CPU), an accelerated processing unit (APU), a field-programmable gate array (FPGA), an application specific integrated circuit (ASIC), a digital signal processor (DSP), and/or the like.

Some instances described herein may relate to a computer storage product with a non-transitory computer-readable medium (also can be referred to as a non-transitory processor readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-5 Access Memory (RAM) devices. Other instances described herein may relate to a computer program product, which can include, for example, the instructions and/or computer code discussed herein.

Examples of computer code may include, but are not limited to, micro-code or microinstructions, machine instructions, such as produced by a compiler, code used to produce a web service, and files containing higher-level instructions that are executed by a computer using an interpreter. For example, instances may be implemented using Java, C++, .NET, or other programming languages (e.g., object-oriented programming languages) and development tools. Additional examples of computer code may include, but are not limited to, control signals, encrypted code, and compressed code.

In some embodiments, the present disclosure may be embodied as a tangible, non-transient, computer-readable media having instructions thereupon which when implemented by a processor or cause the processor to perform any of the methods disclosed herein.

The steps of the method described in the various embodiments and examples disclosed herein are sufficient to carry out the methods of the present invention. Thus, in an embodiment, the method consists essentially of a combination of the steps of the methods disclosed herein. In another embodiment, the method consists of such steps.

The invention claimed is:

1. A method for determining a damage state of a wind turbine gearbox of a wind turbine, comprising:
producing a damage state diagnostic, comprising:
obtaining a measurement dataset from the wind turbine;
integrating field-operator-provided field intelligence into the measurement dataset;
normalizing the measurement dataset with respect to a known failure behavior for the wind turbine gearbox to produce a normalized measurement dataset;
combining the normalized measurement dataset with the known failure behavior to produce the damage state diagnostic;
producing a damage progression model for the wind turbine gearbox using operational data and a state transition function; and
combining the damage state diagnostic with the damage progression model using a hybrid prognostics model to produce a probability distribution for a current damage state estimate.

2. The method of claim 1, wherein the hybrid prognostic model includes a sample-based predictor, and wherein the method further comprises, using the hybrid prognostics model, producing a future state prediction, the future state prediction including:
a probability of the wind turbine gearbox reaching a critical damage threshold for a prediction horizon,
a time to reach the prediction horizon, and
a system state of the wind turbine gearbox at a timestep.

3. The method of claim 1, wherein the damage progression model comprises a physics-based model.

4. The method of claim 3, wherein the physics-based model includes one or more of finite element analysis, computational fluid dynamics, multi-body dynamics, or linear elastic fracture mechanics.

5. The method of claim 1, wherein the damage progression model comprises a machine learning-based model.

6. The method in claim 1, wherein the field-operator-provided field intelligence comprises operator findings of failure or damages seen prior.

7. The method of claim 6, wherein the operator findings of failure or damages seen prior include anecdotes not present in a borescope analysis.

8. The method of claim 6, further comprising building a model using the operator findings of failure or damages seen prior.

9. The method of claim 6, further comprising building a data representation using the operator findings of failure or damages seen prior.

10. The method of claim 1, wherein the measurement dataset comprises one or more of direct measurement data, indirect measurement data, global behavior data, or operational data.

11. The method of claim 10, wherein the measurement dataset comprises direct measurement data and obtaining the measurement dataset includes performing a direct measurement using a measurement unit to obtain the direct measurement data.

12. The method of claim 11, wherein the measurement unit comprises a borescope.

13. The method of claim 10, wherein the measurement dataset comprises indirect measurement data and obtaining the measurement dataset includes performing an indirect measurement using a temperature sensor or a vibration sensor.

14. The method of claim 10, wherein global behavior data includes a comparison of operational data of one or more similar wind turbines similarly configured to the wind turbine.

15. The method of claim 10, wherein operational data includes supervisory control and data acquisition (SCADA) data.

16. The method of claim 15, wherein SCADA data includes one or more of system input data, system output data, or a time series of system logs.

17. The method of claim 16, wherein the SCADA data includes system input data and the system input data includes one or more of wind speed or wind direction.

18. The method of claim 16, wherein the SCADA data includes system output data and the system output data includes power generated.

19. The method of claim 16, wherein the SCADA data includes the time series of system logs and the time series of system logs includes a time series of wind turbine status or faults.

20. The method of claim 1, wherein operational data includes supervisory control and data acquisition (SCADA) data.

21. The method of claim 1, wherein the known failure behavior is derived from historic data.

22. The method of claim 21, wherein the historic data comprises maintenance records, field failure information, root cause analysis, or bill-of-materials data.

23. A system for determining a damage state of a wind turbine gearbox, comprising a processor configured to execute the method of claim 1.

24. A tangible, non-transient, computer-readable media having instructions thereupon which when implemented by a processor cause the processor to perform the method of claim 1.

* * * * *